T. H. MILLER.
OILING MEANS FOR SHAFT BEARINGS.
APPLICATION FILED JUNE 12, 1913.
1,158,529.
Patented Nov. 2, 1915.
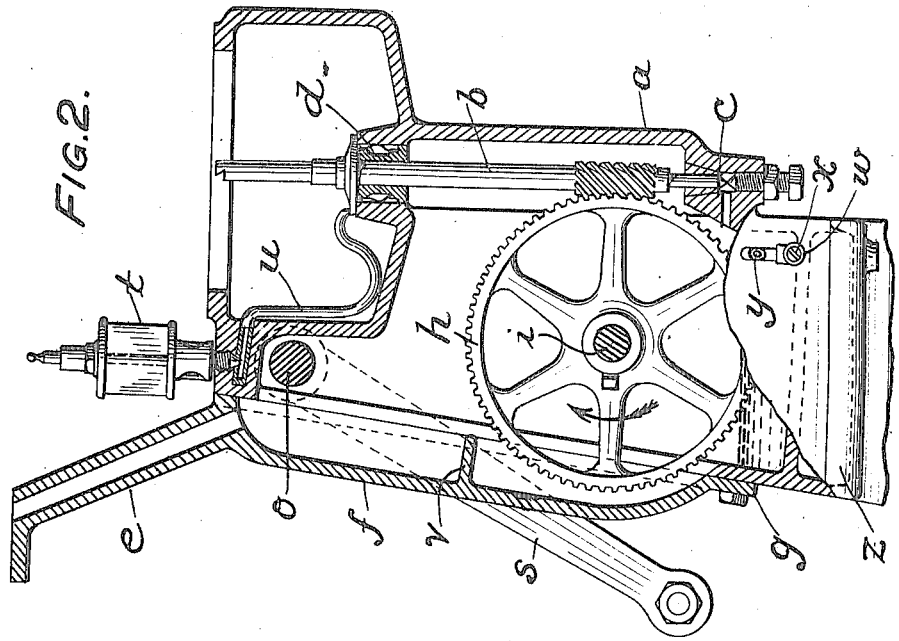
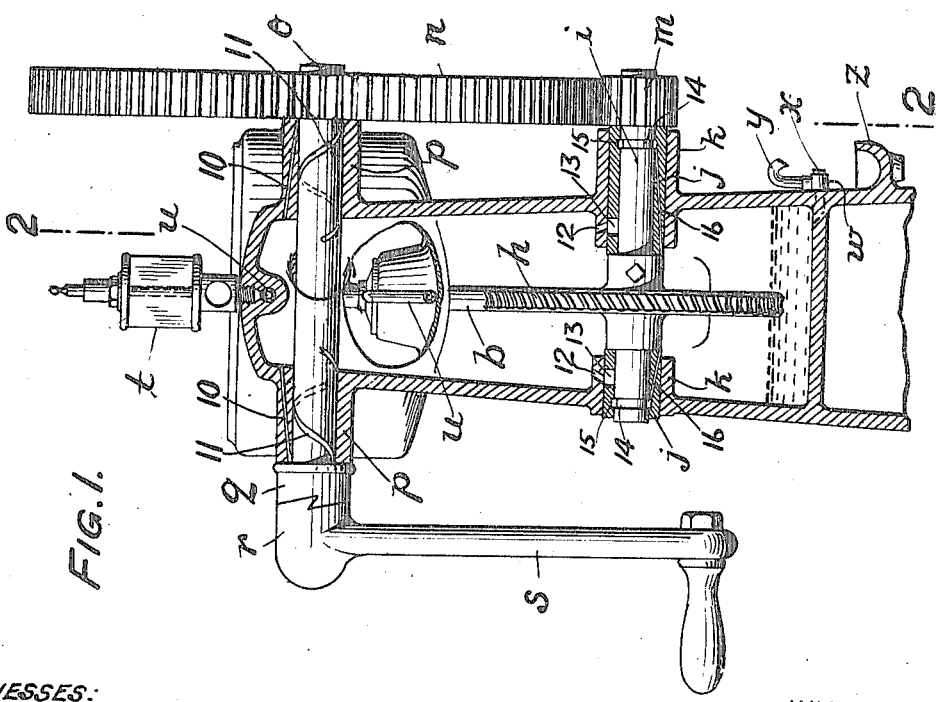
WITNESSES:
Rob R Kitchel
E. E. Wall
INVENTOR
Theodore H. Miller
BY Frank S. Busser
ATTORNEY.

UNITED STATES PATENT OFFICE.

THEODORE H. MILLER, OF POUGHKEEPSIE, NEW YORK, ASSIGNOR TO THE DE LAVAL SEPARATOR COMPANY, A CORPORATION OF NEW JERSEY.

OILING MEANS FOR SHAFT-BEARINGS.

1,158,529.  Specification of Letters Patent.  Patented Nov. 2, 1915.

Application filed June 12, 1913. Serial No. 773,158.

*To all whom it may concern:*

Be it known that I, THEODORE H. MILLER, a citizen of the United States, residing at Poughkeepsie, county of Dutchess, and State of New York, have invented a new and useful Improvement in Oiling Means for Shaft-Bearings, of which the following is a full, clear, and exact description, reference being had to the accompanying drawings, which form a part of this specification.

The object of the invention is to provide means for oiling shaft bearings.

While the invention is of general application, its more specific object is to provide means for use in connection with a splash oil system for the driving mechanism of a centrifugal separator whereby the outer bearings for the shafts, including the comparatively slowly rotating crank shaft and the comparatively rapidly rotating worm wheel shaft, may be effectively oiled, from the inside of the casing, without leakage of the oil beyond the bearings and therefore without waste of clean oil.

In the drawings:

Figure 1 is a side view, largely in section, of the driving mechanism of a centrifugal cream separator, together with the casing and splash oil system, with my invention applied thereto. Fig. 2 is a vertical section on the line 2—2 of Fig. 1.

The spindle of the centrifugal separator bowl (not shown) is connected to the upper end of a worm shaft $b$. The lower extremity of the shaft $b$ rests on a step-bearing $c$ within the casing $a$, while the upper end part of the spindle extends through a top bearing $d$. The lower part of the casing constitutes an oil reservoir. The rear wall of the casing is provided with a vertically extending slotted opening to which is applied the cover plate $f$ of a casting, said plate being of channel-shape open along one side to fit over the opening in the casing and provided with flanges $g$, along the sides and lower end, bolted to the casing. The upper part of the casting consists of a tube $e$. The oil reservoir is initially filled to the desired level through the tube $e$.

The worm shaft $b$ is driven from a worm wheel $h$ on the shaft $i$ extending horizontally across the casing, the ends of the shaft turning in bushings $j$ within tubular bearing members $k$ integral with the casing $a$. One extremity of the shaft $i$ carries a pinion $m$, which is driven from the large gear wheel $n$ on one extremity of the crank driving shaft $o$. The crank shaft $o$ extends through the upper portion of the casing parallel to the worm wheel shaft $i$, and through tubular bearings $p$ integral with the casing. The end of the crank shaft $o$ opposite the gear wheel $n$ has secured to it a clutch member $q$ adapted to be driven from a clutch member $r$ on the hub of the crank $s$, said hub being loose on the shaft $o$.

Mounted on the top of the casing is a sight feed oil cup $t$ adapted to continuously deliver oil to the goose-neck pipe $u$, whence the oil is delivered to the bearing $d$ of the worm shaft $b$. Thence the oil finds its way down to the lower bearing $c$ and thence to the reservoir.

The upper level of the oil in the reservoir extends above the lower part of the periphery of the worm wheel $h$, which, revolving at a high speed, sprays the oil, in the form of a mist, throughout the interior of the casing. In the channel formed in the cover plate $f$ is a guard $v$, which prevents the oil thrown up by the gear wheel from passing beyond it into and out of the tube $e$.

A pipe $w$ extends from the casing $a$ on a level with the lower stratum of oil in the reservoir. The outer end of the pipe $w$ is normally closed by a screw $x$. A branch pipe $y$, located outside the casing, extends up from the pipe $w$, its outwardly bent extremity being open to allow the oil in the reservoir to be continuously discharged therefrom in the same volume that oil is fed to the reservoir from the sight feed oil cup $t$. A drip shelf $z$ receives the used oil discharged from the pipe $y$. The distance above the bottom of the reservoir of the open end of pipe $y$ determines the depth of oil in the reservoir, which is thus maintained constant. Any water or milk entering the reservoir through accident or carelessness, as well as any worn metal, dirt, or other foreign matter, being heavier than the oil, will sink to the bottom of the reservoir; and it is thus only the contaminated oil that is drawn off. By regulating the rate at which the oil is fed from the oil cup $t$, the rate at which the impurities will be drawn off may be accurately determined.

Each tubular member $p$ is provided with a channel 10, the inner end of which opens into the inner wall of the casing. This channel slopes somewhat downwardly toward its outer end, where it communicates with the outer extremity of the crank shaft *o*. Each bearing portion of the crank shaft is provided with a spiral groove 11 formed in such direction that the oil entering the channel 10 and discharged upon the shaft *o* will be carried inward to the interior of the casing. Thus the bearings of the crank shaft *o* are maintained well oiled, but the escape of oil beyond the ends of the shaft outside the casing is absolutely prevented. Without means for compelling the inward flow of oil, the same would escape between the shaft and the casing.

The upper wall of the inwardly projecting end of each tubular bearing member *k* is provided with an orifice 12, through which oil dropping thereinto passes into a registering orifice 13 in the bushing *j*. Thence the oil passes to the shaft *i* whence it spreads in both directions between the shaft and its bushing. The outwardly passing film of oil reaches a groove 14 in the shaft *i*, which groove registers with an annular groove 15 in the bushing *j*. An inclined channel 16 formed in the bushing connects the groove 15 with the interior of the casing. Thus, provision is made for maintaining the bearings of the shaft *i* well oiled, while preventing any escape of the oil beyond the grooves 14 and 15 to the exterior of the casing.

While the means for distributing oil throughout the bearing portions of the worm wheel shaft *i* and crank shaft *o* respectively and for insuring the return to the interior of the casing of the oil thus distributed, may be transposed, pronounced advantages arise from the application to each shaft of the specific oil distributing and returning means shown and described; inasmuch as the very different speeds at which the two shafts rotate, as well as their different sizes, give rise to different requirements that are best met by the different oil distributing and return means that have been respectively devised therefor.

I do not herein claim specifically the means herein set forth for oiling the bearings of the worm wheel shaft, as the same forms the subject matter of a separate application filed March 16, 1914, Serial No. 824,893.

Having now fully described my invention, what I claim and desire to protect by Letters Patent is:

1. Lubricating means for the driving mechanism of centrifugal separators comprising, in combination, a casing within which oil is adapted to be sprayed, a cross-shaft therein, a bearing carried by the casing in which an end of the shaft rotates, means to convey oil from the interior of the casing to the outer bearing portion of the shaft, and a spiral groove extending along the bearing portion of the shaft, the outer end of which is adapted to receive the oil so conveyed and reconvey it to the interior of the casing.

2. Lubricating means for the driving mechanism of centrifugal separators comprising, in combination, a casing within which oil is adapted to be sprayed, a cross-shaft therein, a bearing carried by the casing in which an end of the shaft rotates, a channel communicating at one end with the interior of the casing and at the other end with the outer bearing portion of the shaft and adapted to convey oil from the interior of the casing to the outer bearing portion of the shaft, and a spiral groove in the bearing portion of the shaft the outer end of which communicates with said channel in the rotation of the shaft and the inner end of which opens into the interior of the casing.

In testimony of which invention, I have hereunto set my hand, at Poughkeepsie, N. Y., on this 9th day of June, 1913.

THEODORE H. MILLER.

Witnesses:
 MENARD LEITCH,
 WM. A. HUBBARD.